Figure 4:
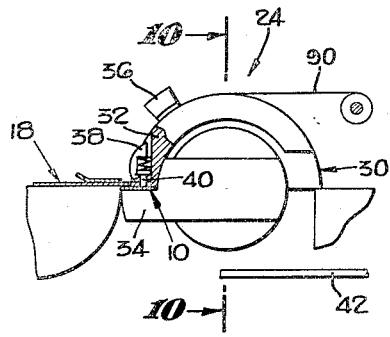

Oct. 8, 1957  G. J. BROWN  2,808,871
TAB-AFFIXING DEVICE
Filed Sept. 20, 1954  4 Sheets-Sheet 1
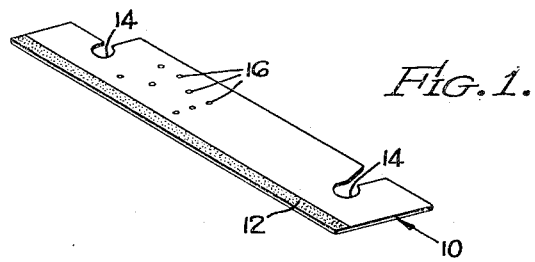
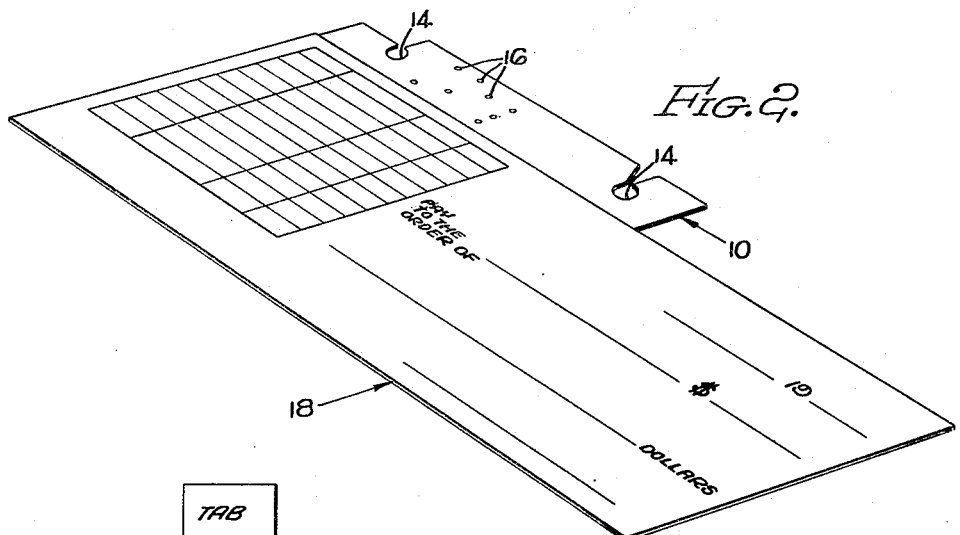
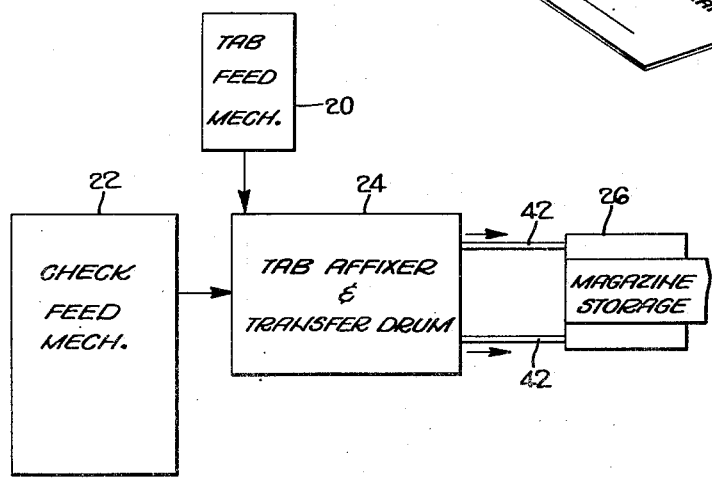
GEORGE JAMES BROWN,
INVENTOR.
BY Lyon & Lyon
ATTORNEYS Oct. 8, 1957   G. J. BROWN   2,808,871
TAB-AFFIXING DEVICE
Filed Sept. 20, 1954   4 Sheets-Sheet 2

GEORGE JAMES BROWN,
INVENTOR.

BY Lyon & Lyon
ATTORNEYS

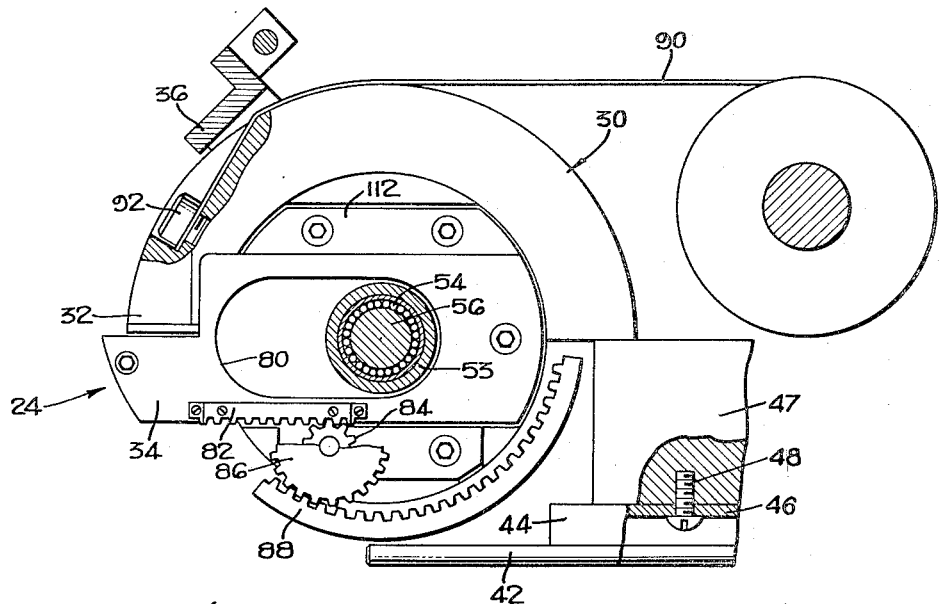
Fig. 11.
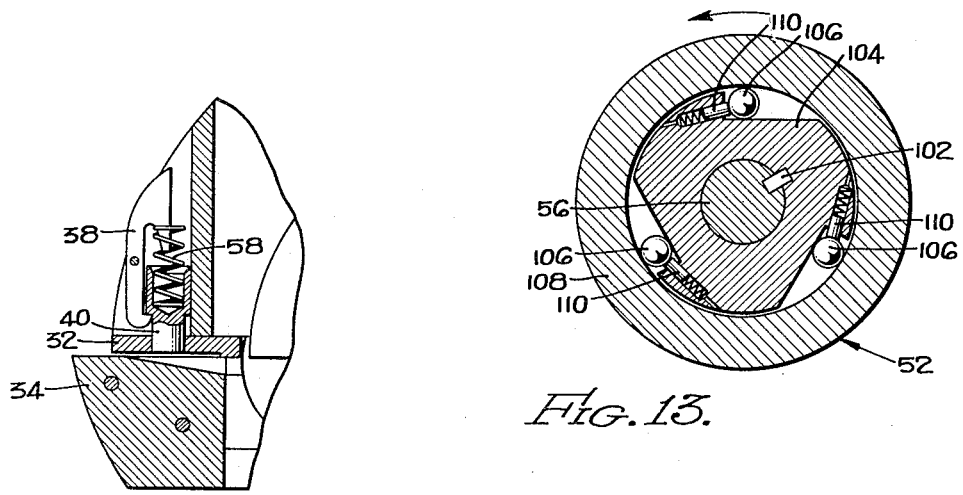
Fig. 12.
Fig. 13.
GEORGE JAMES BROWN,
INVENTOR.
BY Lyon+Lyon
ATTORNEYS

United States Patent Office 2,808,871
Patented Oct. 8, 1957

2,808,871

TAB-AFFIXING DEVICE

George James Brown, Pasadena, Calif., assignor to International Telemeter Corporation, Los Angeles, Calif., a corporation of Delaware Application September 20, 1954, Serial No. 457,248

8 Claims. (Cl. 154—1.6)

This invention relates to a mechanism for affixing a tab to a sheet of paper and the like and for stacking a plurality of said sheets.

In an application to George W. Brown et al., Serial Number 321,452, filed November 19, 1952, for a Computing System, to a common assignee, there is described a means whereby documents or papers, such as checks, charge slips, and the like, may be processed, transported, or otherwise dealt with by machine by means of attaching thereto an auxiliary paper or tape containing information in "machine language." As described, after a sheet, such as a check, is received at a bank, it is necessary to perform certain operations determined by the transaction indicated on the check and then to return the check to the bank upon which the check is drawn. In order to enable this to be done with a minimum degree of difficulty, in view of the mishandling to which the check is usually subjected, a tab or auxiliary sheet of paper having a uniform size and shape and coded information thereon relating to the routing of such check and the accounting transaction required to be made is affixed to the check. The required affixing may be done by hand where the number of checks to be handled is not very large. However, obviously the advantages of affixing a tab to a check can be fully realized where a large number of such checks must be handled, such as occurs in present-day banking practice. Accordingly, to facilitate the operation of automatically handling checks, it is necessary to affix a tab of the type described to a check automatically with precision and with speed.

A feature of this invention is the provision of an automatic tab-affixing apparatus.

Another feature of this invention is the provision of tab-affixing apparatus which is simple, and novel, and permits rapid operation.

Once the tab is affixed to a check or sheet of paper carrying related information, it is necessary to remove a tab and sheet from the tab-affixing device and arrange them and subsequent ones properly for subsequent handling.

A further feature of the present invention is the provision of a mechanism whereby, after a tab is affixed, the apparatus automatically stacks the sheets on a subsequent apparatus. This apparatus may then be removed when loaded and replaced with an empty one.

These and other objects of the invention may be achieved in apparatus which includes a drum having an upper and a lower jaw separated by a slot of sufficient thickness to admit a tab. The tab has one end covered with an adhesive material. This end extends outward from the slot and faces upward. The upper jaw is sufficiently shorter than the lower jaw to uncover the adhesive material. A check is positioned to overlap, with one side, the adhesive material. A hammer is brought down upon the check and serves to press it onto the tab, which adheres to the check. The tab has perforations therein. The upper jaw has pins which are aligned with these perforations. These pins are permitted to engage these perforations when the hammer strikes the check. The drum is then rotated away from the tab-affixing position. This enables the lower jaw to move transversely to the axis of rotation so that the tab is carried by the pins. The rotation continues until the pins are brought against a pair of guide rails, which also are aligned with the tab openings. The drum continues to urge the pins against the guide rails until they have driven back into the upper jaw, thus transferring the tab and its attached check or sheet onto the guide rails. The mechanism then returns to receive a new tab and check.

Figure 10:
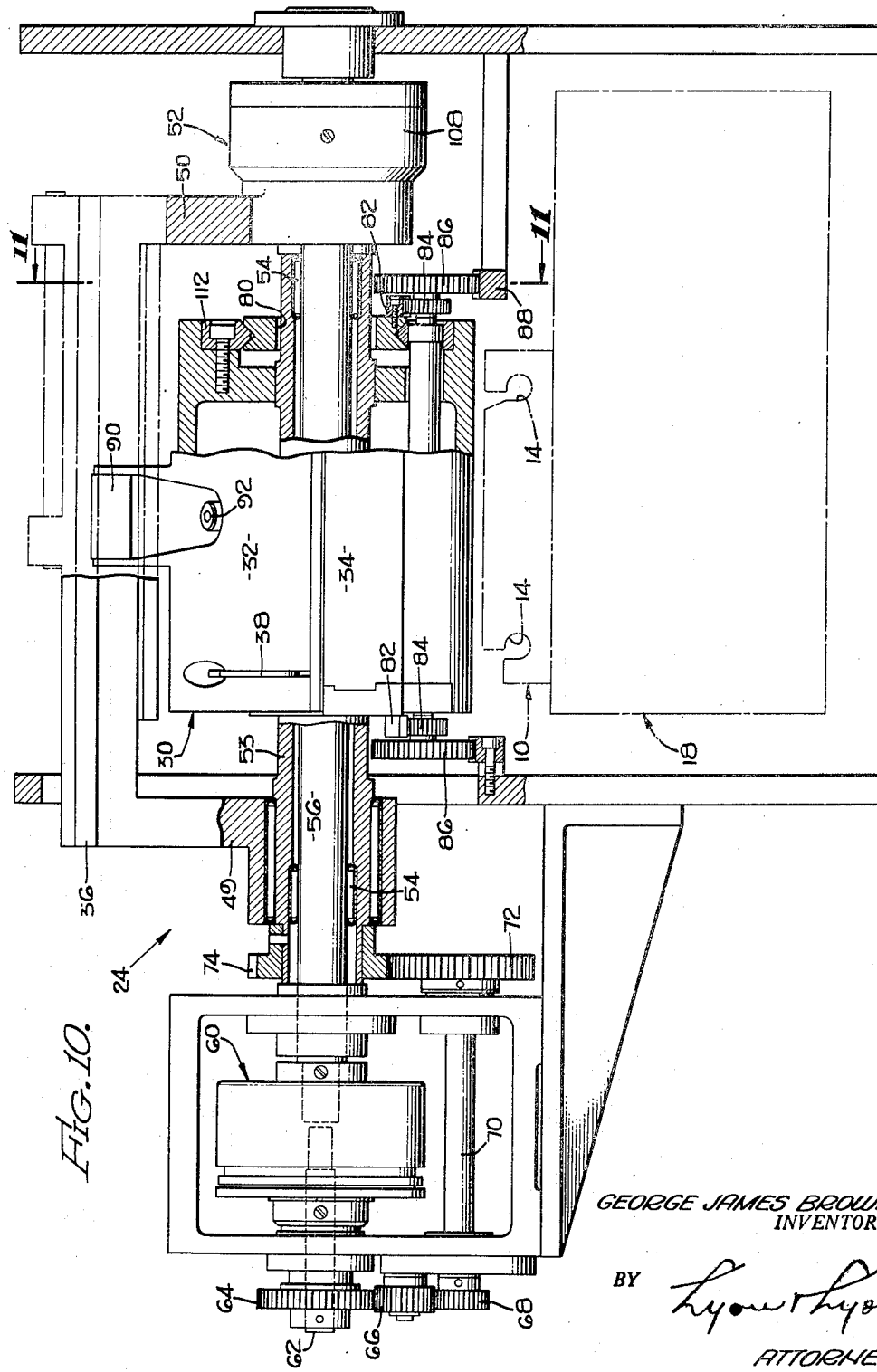

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 1 shows a tab;
Figure 2 shows a check with a tab affixed thereto;
Figure 3 shows a block diagram of the arrangement employed with the embodiment of the invention;
Figures 4 through 9 are diagrams showing the operation of the embodiment of the invention in the successive steps required for affixing a tab to a sheet;
Figure 10 is a view partially in section of an embodiment of the invention;
Figure 11 is a view along the line 11—11 of Figure 10;
Figure 12 is a view showing the detail of the pin-latching mechanism; and
Figure 13 is a view of an overriding clutch employed in an embodiment of the invention.

Reference is now made to Figure 1, where there may be seen a tab 10 of the type intended, which it is desired to affix to a sheet of material such as a check, a booklet, or any other form of writing for the purpose of routing and/or accounting operations. The tab has one edge to which adhesive material 12 is applied. This may be any desirable type of adhesive material—thermal, pressure sensitive, and the like.

The tab also has two perforations 14 which are employed for stacking purposes, as described subsequently. These two perforations may also be designated as guide holes or guide openings. Also on the tab are perforations 16 which may be in the binary code and are used to represent the routing and other information required for performance of desired automatic operations maintained.

In Figure 2 the tab is shown affixed to a check 18. A check is described by way of illustration and is not to be taken as a limitation upon the invention, since with the apparatus shown herein tabs may be affixed to any sheets, single or in quantity, such as booklet form, if desired. Tabs may be fed from a tab-feed mechanism 20, together with checks from a check-feed mechanism 22, to a tab affixer and transfer drum 24. After affixing the tab, the check and tab are transferred or stacked on a storage mechanism 26. An example of a suitable storage mechanism is described and claimed in an application for a Cartridge, by Peter Van Horne Serrell, Serial No. 457,238, filed September 20, 1954, and assigned to a common assignee. The tabs may have the information for each check to which they are to be affixed punched therein in advance of being affixed, in which event there must be correlation between the check-feed mechanism and the tab-feed mechanism to insure that each tab is united with the check for which it is intended. If desired, however, the tab may have the information perforated therein subsequent to being affixed to the check. In any event, this type of operation is not considered a part of this invention and is only recited for the purpose of illustrating how the machine may be employed. The tab-feed mechanism 20 may consist of a roll of tabs which are fed, one at a time, to the tab affixer 24. The check-feed mechanism may consist of a conveyor mechanism which carries the checks, one at a time, to the tab affixer.

Reference is now made to Figures 4 through 9 for showing the operation of the embodiment of the invention in affixing a tab to a check. A drum 30 has an upper jaw 32 and a lower jaw 34. The upper and lower jaws are arranged to be rotatably mounted about a common axis. The upper and lower jaws are separated by a space sufficient to admit a tab of the type shown in Figure 1. The upper jaw is sufficiently shorter than the lower jaw to permit the tab edge, which has the adhesive thereon, to protrude. A check 18 is carried up against the upper jaw so that one end abuts or overlaps the adhesive-carrying end of the tab. A hammer 36 is mounted to rotate about the same axis as the drum. When the check is positioned over the tab, the hammer is rotated to press the check against the tab. The hammer may be equipped with a heating element if the adhesive material is of the thermal type. Alternatively, the lower jaw may have a heating element to soften adhesive material, so that, when the hammer presses the check against the tab, the check and tab are affixed to one another.

Figure 5:
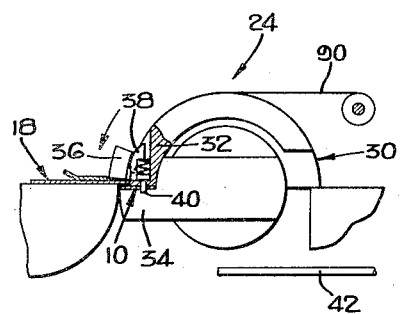
Figure 6:
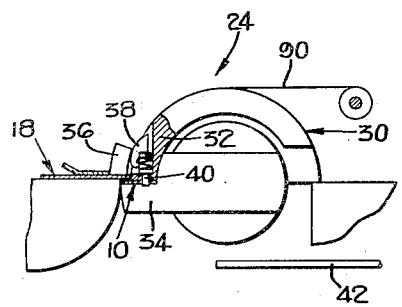
Figure 7:
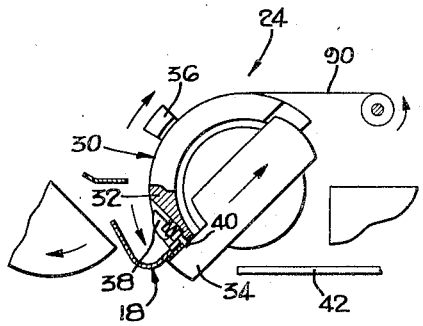
Figure 8:
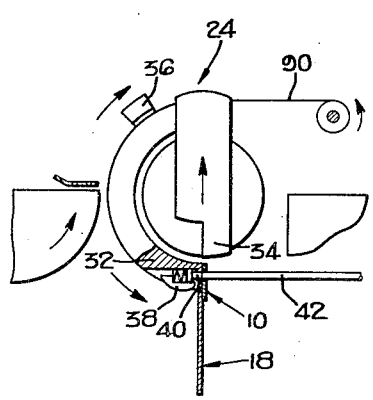
Figure 9:
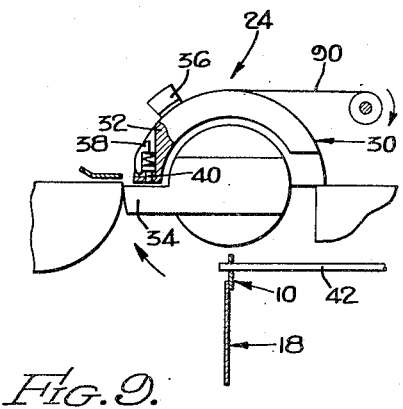

As shown in Figure 5, the hammer is rotated counter-clockwise to exert pressure. When it strikes the check, it releases a latch 38 restraining a pair of spring-biased pins 40. The pins are carried in the upper jaw and are aligned with the guide holes 14 in the tab, so that when they are released they enter into these holes. This may be seen from Figures 5 and 6. The hammer is then retracted, and, as it begins to return, the drum rotates in a counterclockwise direction. In thus rotating, the drum pulls the check downward from the apparatus which conveyed it to the tab-affixing position. As the drum rotates in a counterclockwise direction the lower jaw 34 is moved in a direction transverse to the axis of rotation, so that the lower jaw is completely withdrawn and the check and tab are carried by the pins extending from the upper jaw. The drum continues to rotate until the pins are pressed against a pair of guide rails 42. These are two rods or rails thin enough to enter the tab perforations. They are aligned with the perforations in the tab. With continued pressure against the guide rails, the pins 40 are driven back into the recess in the upper jaw, and the latch again restrains them. This results in the tab being transferred onto the guide rails. A spring 90 then rotates the drum back to its initial tab-affixing position.

Reference is now made to Figure 10, which shows in section an embodiment of the invention. The hammer 36 has what may be termed an inverted U-shape, with the end of one arm 49 being rotatably mounted over a hollow shaft 53. The other arm 50 is attached to be driven from an overriding clutch 52, a cross section of which is shown in Figure 13. The drum 30 is rotatably mounted by bearings 54 on a shaft 56. This shaft is coupled through the overriding clutch 52 to the hammer arm 50. The upper jaw 32 includes a pair of latches 38, which serve to restrain the pins 40 (details of which are shown in Figure 12). The pins are each biased by a spring 58. It may be seen that as the hammer rotates downward over the upper jaw it strikes the latches 38, thus releasing the spring-biased pins 40. The shaft 56 extends into an electrical clutch 60. Another short shaft 62 extends from the clutch and is engaged with a first gear 64. This engages a second gear 66, and, in turn, this serves to drive a third gear 68. The third gear is mounted on one end of a short shaft 70, and, on the other end of this shaft, is a large gear 72. This large gear serves to drive a gear 74, which is mounted upon the hollow shaft 53. A portion of the upper jaw has been omitted, in order to reveal to better advantage the construction of the embodiment of the invention. The lower jaw, as may be seen in Figure 11, is also concentrically mounted with the upper jaw. It consists of a somewhat U-shaped member with the crossbar of the U serving as a base upon which the tab is positioned in the tab-affixing position. The arms are mounted, as previously stated, to enable rotation around the drum axis. The arms have a large slot 80 to enable transverse motion of the lower jaw as the drum is rotated. On the lower sides of both arms of the lower jaw may be seen a rack gear 82. This engages a small pinion gear 84, which is directly connected by means of a common shaft with a large pinion gear 86. The large rack gear operatively engages a portion of a ring gear 88. Accordingly, it may be seen that as the drum 30 rotates in a counterclockwise direction the pinion gears on either side of the lower jaw are rotatably driven by the ring gear, thus transmitting the energy to the rack gears 82. This causes the lower jaw to be withdrawn to enable the transfer of the tab and affixed check to the stacking guide rails 42.

A negator spring 90 is attached to the drum by a bolt 92. This provides the energy to return the drum to its tab-affixing position. The overriding clutch shown in Figure 13 includes the inner shaft 56, which is fixed by a key 102 to a member 104. Three balls 106 support this member centrally within an outer hollow circular member 108. The three balls are urged by means of spring-loaded pins 110 in a clockwise direction. As the outer member rotates in a clockwise direction, the three balls are urged also in the clockwise direction, and, in view of the gradually constricting aperture provided between the inner member and the outer circular member, a binding of the two members is effectuated. The rotation will carry the shaft 56 therewith. Any rotation in the opposite direction urges the balls toward the spring-biased pins 110, which is in a direction of a larger space, thus permitting the outer member to rotate freely and not carry the shaft therewith. The arm 50 of the hammer is attached to the outer member 108. Accordingly, when a check is positioned over a tab, the hammer is driven at its top portion by a means (not shown) in a counterclockwise direction to press the check against the tab. The counterclockwise rotation conveys no rotational energy in the overriding clutch because of the slippage between the circular member 108 and the inner member 104. When the hammer has reached the position of engaging the check, it energizes by a microswitch (not shown) the electrical clutch 60. The hammer is then withdrawn by the driving means (not shown). In being withdrawn, it is rotated in a clockwise direction. This causes the overriding clutch to apply rotational energy to the circular member 108. Accordingly, this enables the transmission of the rotational energy developed when the hammer is restored in a clockwise direction which is communicated through the overriding clutch to the shaft 56 to be applied through the electrical clutch 60 to the gear 64. The gear 64 rotates with the shaft in a clockwise direction. The second gear 66 rotates in a counterclockwise direction. The third gear 68 rotates in a clockwise direction, carrying with it the gear 72. This, in turn, causes the drum to be driven by the gear 74 in a counterclockwise direction. The rotation of the drum in a clockwise direction enables the operations described in Figures 6 through 9.

The rack gear 82 is driven via the pinion gears 84, 86 and the ring gear 88 so that the lower jaw is withdrawn, thus enabling the transfer of the tab to the guide rail 42. Accordingly, it can readily be seen how the tab-affixing mechanism operates to affix a tab to a sheet or check and to transfer these to the subsequent guide rails, which successively capture successive tab-affixed sheets. When the guide rails are filled, they can be removed and replaced. The tab-feed mechanism, as previously stated, may be a roll which feeds tabs forward into the slot between the upper and lower jaw. The hammer may have a sharp edge on the feed side of the tab to cut off a single tab. The tab-affixing mechanism can rapidly and successively operate to affix these tabs and store them on the following guide rails. The power means for the hammer may be simply a bell crank arrangement. The lower jaw, as may be seen more clearly in Figures 10 and 11, is held at its upper side by guide rails 112, which insure that it will not twist out of position.

The guide rails 42 are attached to a pair of holding arms 44, which extend from a crosspiece, not shown. This crosspiece is grooved so that it dovetails with a member 46. This member is attached to a holding member 47 by means of a screw 48. This holding member may be supported on its own platform, not shown, or may be attached to the supports for the apparatus, so that the guide rails 42 are held in position to receive tabs. By reason of the dovetail arrangement, when the cartridge is filled, it may be slid out and an empty cartridge inserted in its place. If desired, however, the cartridge may be permanently attached and a transfer of the checks with the tabs attached thereto may simply be made by sliding these checks off the rails onto the rails of another cartridge which can be held with its guide rails abutting the rails 42.

Accordingly, there has been shown and described hereinabove novel and useful tab-affixing apparatus, which also serves the function of stacking the affixed material in subsequent holding apparatus. The device is novel, useful, and simple.

What is claimed is:

1. Apparatus for affixing a tab, having an adhesive along one edge and guide holes elsewhere, to a sheet of paper comprising a lower jaw, an oppositely positioned upper jaw, said upper jaw being spaced sufficiently from said lower jaw to permit insertion of a tab therebetween, said upper jaw being sufficiently shorter than said lower jaw to expose the one edge of said tab having adhesive therealong, means to position a sheet against said upper jaw and overlapping said tab one edge, a hammer, means to actuate said hammer to press together said tab and sheet to cause them to adhere to one another, a pair of pins mounted within said upper jaw opposite said guide holes, means to move said pins into said guide holes responsive to actuation of said hammer, means to rotate said upper and lower jaw together, and means to move said lower jaw laterally to permit removal of said tab and document from said pins.

2. Apparatus for adhering to a sheet of paper a tab having adhesive material along an edge and a pair of guide openings through another portion thereof, and placing these on guide rails comprising means to support said tab with only the edge covered with adhesive material being exposed, means to position said sheet to have an edge overlap said exposed edge, means to press said sheet and tab together where they overlap, a pair of spring-biased pins carried by said means to support said tab, means to urge said pins through said guide openings, and means to carry said tab and sheet on said pins to said guide rails and to press said pins against said guide rails until the pins are removed from said guide openings and said tab and sheet are supported by said guide rails.

3. Apparatus for adhering to a sheet of paper a tab having adhesive material along an edge, a pair of guide openings through another portion thereof, and placing said tab on guide rails comprising means to press said sheet against said adhesive material edge to cause them to adhere together, a pair of spring-biased pins, means to urge said pins through said guide openings, and means to carry said tab and sheet on said pins to said guide rails and to press said pins against said guide rails until the pins are removed from said guide openings and said tab and sheet are supported by said guide rails.

4. Tab affixing apparatus for adhering to a sheet of paper a tab, having adhesive material along an edge and a pair of guide openings through another portion thereof, and placing these on guide rails comprising a lower jaw, an opposed upper jaw spaced from said lower jaw a distance just sufficient to permit the insertion of a tab therebetween, said upper jaw being shorter than said lower jaw to permit exposure of said adhesive material, said upper jaw having a pair of openings therein, means to position said sheet to have a portion overlap the exposed adhesive material, a hammer, means to move said hammer to press said sheet against said adhesive material, means to withdraw said hammer, a pair of pins, means to yieldably support said pins to extend from said pair of openings in said upper jaw, means to urge said pins into engagement with said tab guide openings, means to withdraw said lower jaw, and means to move said upper jaw to press said pins against said guide rails until they are retracted from said guide openings and said tab and sheet are supported by said guide rails.

5. Apparatus for adhering to a sheet of paper a tab, having adhesive material along one edge and a pair of guide openings through another portion, and placing these on guide rails comprising a lower jaw, an opposed upper jaw spaced from said lower jaw a distance just sufficient to permit the insertion of a tab therebetween, said upper jaw being shorter than said lower jaw to permit exposure of said adhesive material, means to position said sheet to have an edge overlap the exposed adhesive material, a rotatably mounted hammer, means to rotate said hammer to press said sheet against said adhesive material, means to withdraw said hammer, a pair of spring-biased pins mounted in openings in said upper jaw in alignment with said guide openings, means to urge said pins into engagement with said guide openings, means to rotate said upper and lower jaws toward said guide rails until said tab and sheet are carried by said pins, means to withdraw said lower jaw, said upper jaw still being rotated until said pins are pressed against said guide rails until they are pushed out of said guide openings and said tab and sheet are supported by said guide rails, and means to return said upper and lower jaws to their initial operating position.

6. Tab affixing apparatus for adhering to a sheet of paper a tab, having adhesive material along one edge and a pair of guide openings through the opposite edge, and placing these on guide rails, said apparatus comprising a substantially cylindrically shaped body including an upper and lower jaw portion separated by a slot to permit insertion of a tab therein, said upper jaw being shorter than said lower jaw an amount sufficient to expose said adhesive material, means to position said sheet against said upper jaw and overlapping said exposed tab edge, a hammer coaxially mounted with said cylindrically shaped body, means to rotate said hammer to press said sheet and tab together, means to restore said hammer to its initial position, a pair of spring-biased pins mounted in openings in said upper jaw opposite said tab guide openings, latch means released responsive to said hammer rotation to admit said pins into said guide openings, means to rotate said upper and lower jaws together, and means to move said lower jaw transverse to said axis of rotation, said upper jaw being rotated by said means to rotate until said pins are pressed back into said openings in said upper jaw by said guide rails and held by said latch means whereby said tab is transferred onto said guide rails.

7. Tab affixing apparatus as recited in claim 6 wherein there is included a shaft, and wherein said hammer is supported from said shaft and said cylindrically shaped body is rotatably mounted on said shaft.

8. Tab affixing apparatus as recited in claim 6, said means to move said lower jaw transversely to said axis of rotation includes a rack gear mounted on the side of said lower jaw, a pinion gear operatively positioned on said drum with respect to said rack gear, a ring gear positioned to co-operate with said pinion gear whereby rotation of said drum causes said pinion gear to be rotated by said ring gear which moves said rack gear and said lower jaw transversely of the axis of rotation.

(References on following page)

References Cited in the file of this patent

UNITED STATES PATENTS

| | | |
|---|---|---|
| 1,283,873 | Nickerson | Nov. 5, 1918 |
| 2,266,171 | Davis | Dec. 16, 1941 |
| 2,459,263 | Callanan | Jan. 18, 1949 |
| 2,520,322 | Mestre | Aug. 29, 1950 |
| 2,591,519 | Decker | Apr. 1, 1952 |
| 2,596,253 | Kurkjian | May 13, 1952 |
| 2,605,920 | Hammel | Aug. 5, 1952 |
| 2,704,566 | Thompson et al. | Mar. 22, 1955 |